(12) United States Patent
Hudman

(10) Patent No.: US 12,058,427 B2
(45) Date of Patent: Aug. 6, 2024

(54) CAMERA DEVICE EMPLOYING SPATIALLY VARYING POLARIZERS

(71) Applicant: Valve Corporation, Bellevue, WA (US)

(72) Inventor: Joshua Mark Hudman, Issaquah, WA (US)

(73) Assignee: Valve Corporation, Bellevue, WA (US)

( * ) Notice: Subject to any disclaimer, the term of this patent is extended or adjusted under 35 U.S.C. 154(b) by 605 days.

(21) Appl. No.: 17/170,489

(22) Filed: Feb. 8, 2021

(65) Prior Publication Data

US 2021/0250476 A1 Aug. 12, 2021

Related U.S. Application Data

(60) Provisional application No. 62/975,063, filed on Feb. 11, 2020.

(51) Int. Cl.
*H04N 23/55* (2023.01)
*G02B 5/30* (2006.01)
*G02B 27/28* (2006.01)

(52) U.S. Cl.
CPC ........... *H04N 23/55* (2023.01); *G02B 5/3083* (2013.01); *G02B 27/285* (2013.01); *G02B 27/286* (2013.01)

(58) Field of Classification Search
CPC .... H04N 23/55; G02B 5/3083; G02B 27/285; G02B 27/286
USPC ........................................................ 358/490
See application file for complete search history.

(56) References Cited

U.S. PATENT DOCUMENTS

| | | | |
|---|---|---|---|
| 6,982,773 B2 | 1/2006 | Kurtz et al. | |
| 7,160,017 B2 | 1/2007 | Lee et al. | |
| 7,295,312 B1 | 11/2007 | Gerhart et al. | |
| 8,004,675 B2 | 8/2011 | Lefaudeux | |
| 8,235,533 B2 | 8/2012 | Hudman et al. | |
| 8,368,889 B2 | 2/2013 | Schwiegerling et al. | |
| 8,982,313 B2 | 3/2015 | Escuti et al. | |
| 9,298,041 B2 | 3/2016 | Escuti et al. | |
| 9,335,586 B2 | 5/2016 | Escuti et al. | |
| 9,410,677 B2 | 8/2016 | Wheatley et al. | |
| 10,203,489 B2 | 2/2019 | Khan et al. | |

(Continued)

FOREIGN PATENT DOCUMENTS

CN 105606217 B 10/2017

OTHER PUBLICATIONS

Hornburg et al., "Multiband retardation control using multi-twist retarders," Proc. of SPIE, Polarization: Measurement, Analysis, and Remote Sensing XI, vol. 9099, 90990Z, 2014, 9 pages.

(Continued)

*Primary Examiner* — Michael H Caley
*Assistant Examiner* — William D Peterson
(74) *Attorney, Agent, or Firm* — Seed IP Law Group LLP

(57) ABSTRACT

Systems and methods of the present disclosure provide a compact camera device that utilizes one or more spatially varying polarizers, such as one or more multi-twist retarders, to provide compact designs with improved performance. The spatially varying polarizers may be used to multiplex light received by a camera, which allows optics to modify (e.g., focus) incident light in a polarization specific manner to provide better resolution, reduced form factor, or other advantages.

11 Claims, 2 Drawing Sheets

(56) References Cited

U.S. PATENT DOCUMENTS

| | | | | |
|---|---|---|---|---|
| 2007/0139777 | A1* | 6/2007 | Williams | G02B 5/1876 |
| | | | | 359/201.1 |
| 2009/0161031 | A1* | 6/2009 | Kaise | H04N 9/3129 |
| | | | | 349/5 |
| 2009/0237662 | A1 | 9/2009 | Chang et al. | |
| 2011/0310220 | A1 | 12/2011 | McEldowney | |
| 2012/0075513 | A1* | 3/2012 | Chipman | G01J 4/04 |
| | | | | 348/302 |
| 2013/0027656 | A1* | 1/2013 | Escuti | G02B 5/3083 |
| | | | | 349/193 |
| 2013/0027713 | A1 | 1/2013 | Kudenov | |
| 2013/0286479 | A1 | 10/2013 | Sung et al. | |
| 2015/0131311 | A1 | 5/2015 | Wheatley et al. | |
| 2016/0182889 | A1 | 6/2016 | Olmstead | |
| 2016/0349516 | A1 | 12/2016 | Alexander et al. | |
| 2017/0261760 | A1* | 9/2017 | Takiguchi | G01J 1/0429 |
| 2019/0243147 | A1 | 8/2019 | Smithwick et al. | |
| 2019/0377183 | A1 | 12/2019 | Sharp | |
| 2020/0301147 | A1 | 9/2020 | Klug | |

OTHER PUBLICATIONS

Hornburg et al., "Wide color gamut multi-twist retarders," Proc. of SPIE, Emerging Liquid Crystal Technologies X, vol. 9384, 93840W, 2015, 11 pages.

ImagineOptix, "Consumer Electronics Optics," Augmented and Virtual Reality Optics Technology in Consumer Electronics—ImagineOptix, retrieved from <https://www.imaginoptix.com/applications/consumer-electronics/>, on Dec. 17, 2019, 3 pages.

Komanduri et al., "Multi-twist retarders for broadband polarization transformation," Proc. of SPIE, Emerging Liquid Crystal Technologies VII, vol. 8279, 82790E, 2012, 10 pages.

Komanduri et al., "Multi-twist retarders: broadband retardation control using self-aligning reactive liquid crystal layers," Optics Express, Optical Society of America, vol. 21, No. 1 Jan. 14, 2013, 17 pages.

Perreault, "Triple Wollaston-prism complete-Stokes imaging polarimeter," Optics Letters, Optical Society of America, vol. 38, No. 19, Oct. 1, 2013, 4 pages.

International Search Report and Written Opinion, mailed Jun. 25, 2021, for International Application No. PCT/US 21/17087, 12 pages.

European Search Report, dated Feb. 19, 2024, for European Patent Application No. 21754336.2. (13 pages).

He et al., "Liquid Crystal Beam Steering Devices: Principles, Recent Advances, and Future Develoments," *Crystals* 9(6):1-24, Jun. 5, 2019. (24 pages).

Kim et al., "Wide-angle, Nonmechanical Beam-Steering Utilizing Liquid Crystal Polarization Grating," Poster Session ILCC 2008, Jeju Island, South Korea, Jun. 29-Jul. 4, 2008. (1 page).

* cited by examiner

CAMERA DEVICE EMPLOYING SPATIALLY VARYING POLARIZERS

BACKGROUND

Technical Field

The present disclosure relates to a camera device and, in particular, a camera device employing spatially varying polarizers.

Description of the Related Art

The wide ranging adoption of cameras in various consumer electronics device has driven a need for both enhancing image capture capabilities and reducing the form factor (or size) of cameras. It is advantageous to reduce the size of a consumer electronics device camera, such as a smartphone camera or camera for a head-mounted display (HMD) device, to maintain an overall compact form factor of the consumer electronics device. Furthermore, as users increasingly rely on consumer electronics device cameras for taking pictures and video, it has become increasingly important to equip consumer electronics device cameras with various capabilities within the compact form factor.

BRIEF SUMMARY

A camera device may be summarized as including a spatially varying polarizer configured to receive light; and diffract a first component of the light at a first angle and a second component of the light at a second angle, the first component having a first polarization and the second component having a second polarization different from the first polarization; first and second optical portions positioned to receive the first and second components, respectively, and configured to perform first and second optical correction on the first and second components, respectively, and to output first and second optically-corrected components, respectively; and a sensor configured to capture the first and second optically-corrected components of the light. The first optical portion may be configured to perform at least one of diffraction according to a diffraction pattern, light collimation, light focusing, image sharpening, angular resolution modification, focal length modification or aberration correction on the first component. The second optical portion may be configured to perform at least one of diffraction according to a diffraction pattern, light collimation, light focusing, image sharpening, angular resolution modification, focal length modification or aberration correction on the second component. The spatially varying polarizer may include a multi-twist retarder (MTR). The camera device may include a controller configured to switch the spatially varying polarizer between active and inactive states. The sensor may include a first sensor configured to capture the first optically-corrected component; and a second sensor configured to capture the second optically-corrected component.

A camera device may be summarized as including a sensor configured to capture an image at a plurality of pixels; a spatially varying polarizer configured to receive light; and output a first component of the light having a first polarization state and a second component of the light having a second polarization state different from the first polarization state; an optical portion configured to perform optical correction on the first and second components, respectively, and output first and second optically-corrected components, respectively; and a spatially varying sensor filter operative to permit or block passage of the first optically-corrected component to the sensor based on the first polarization state and permit or block passage of the second optically-corrected component to the sensor based on the second polarization state. The optical portion may perform at least one of diffraction according to a diffraction pattern, light collimation, light focusing, image sharpening, angular resolution modification, focal length modification or aberration correction on the first component. The optical portion may perform at least one of performing diffraction according to a diffraction pattern, light collimation, light focusing, image sharpening, angular resolution modification, focal length modification or aberration correction on the second component. The spatially varying polarizer and the spatially varying sensor filter may each include a multi-twist retarder (MTR). The spatially varying sensor filter may be configured to operate in a first state having a first filter pattern and a second state having a second filter pattern. The camera device may include a controller configured to output a signal to the spatially varying sensor filter indicative of whether the spatially varying sensor filter is to operate in the first state or the second state. In the first state, the spatially varying sensor filter may be configured to permit passage of light having the first polarization state to a first set of pixels of the plurality of pixels and block passage of light having the second polarization state to the first set of pixels of the plurality of pixels. In the first state, the spatially varying sensor filter may be configured to block passage of light having the first polarization state to a second set of pixels of the plurality of pixels and permit passage of light having the second polarization state to the second set of pixels of the plurality of pixels. The first and second sets of pixels may be mutually exclusive and a combination of the first and second sets of pixels may form the plurality of pixels. The controller may be configured to alternately switch the spatially varying sensor filter between the first state and the second state between consecutive frames of image or video capture. The controller may be operative to generate two full resolution images using two consecutive frames, each of the consecutive frames including a half-resolution image for light received in each of the first and second polarization states. The controller may be configured to operate the spatially varying sensor filter in the first state or the second state for narrow-angle image or video capture.

DETAILED DESCRIPTION

In the following description, certain specific details are set forth in order to provide a thorough understanding of various disclosed implementations. However, one skilled in the relevant art will recognize that implementations may be practiced without one or more of these specific details, or with other methods, components, materials, etc. In other instances, well-known structures associated with computer systems, server computers, and/or communications networks have not been shown or described in detail to avoid unnecessarily obscuring descriptions of the implementations.

Unless the context requires otherwise, throughout the specification and claims that follow, the word "comprising" is synonymous with "including," and is inclusive or open-ended (i.e., does not exclude additional, unrecited elements or method acts). References to the term "set" (e.g., "a set of items"), as used herein, unless otherwise noted or contradicted by context, is to be construed as a nonempty collection comprising one or more members or instances.

Reference throughout this specification to "one implementation" or "an implementation" means that a particular feature, structure or characteristic described in connection with the implementation is included in at least one implementation. Thus, the appearances of the phrases "in one implementation" or "in an implementation" in various places throughout this specification are not necessarily all referring to the same implementation. Furthermore, the particular features, structures, or characteristics may be combined in any suitable manner in one or more implementations.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the implementations.

Figure 1:
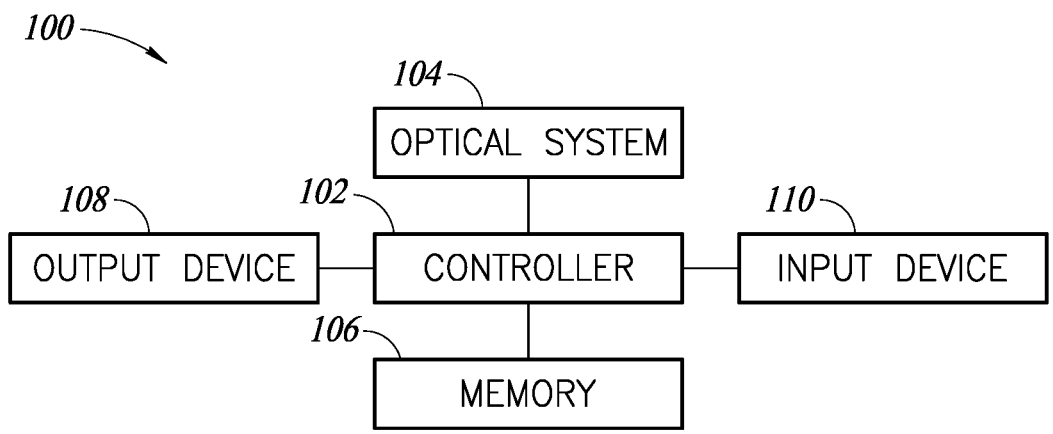
FIG. 1 shows a schematic block diagram of a camera device in accordance with an embodiment.

FIG. 1 shows a block diagram of a camera device 100 in accordance with an embodiment. The camera device 100 includes a controller 102, an optical system 104, memory 106, an output device 108 and an input device 110. The controller 102 is operatively coupled to the optical system 104, memory 106, output device 108 and input device 110.

The controller 102 may be any type of device configured to execute executable instructions stored in the memory 106. When the executable instructions are executed by the controller 102, the executable instructions cause the controller 102 to perform the functions or techniques described herein. The controller 102 may be a processor, a microcontroller or a microprocessor, among others, and may include an arithmetic and logic unit (ALU), among other computational units. The controller 102 may perform the techniques described herein. The controller 102 may be an embedded system-on-chip (SoC). The controller 102 may include a central processing unit (CPU) or graphics processing unit (GPU), among others.

The optical system 104 may be an assembly of one or more image sensors, lenses, filters, apertures and spatially varying polarizers described herein, among others that operate to capture one or more images. The controller 102 may send control data to the optical system 104 to control the optical system 104 and specify the operating characteristics of the optical system 104. The controller 102 may also output a command to the optical system 104 to trigger image capture. The optical system 104 may capture one or more images and output data representative of the one or more images to the controller 102.

The memory 106 may be any non-transitory computer-readable storage medium. The memory 106 may be configured to store executable instructions that, when executed by the controller 102, cause the controller 102 to perform the operations, methods or techniques described herein. The executable instructions may be a computer program or code. The memory 106 may include a random access memory (RAM) and/or a read-only memory (ROM). The controller 102 may cause captures images to be stored in the memory 106.

The output device 108 may be one or more of any type of device configured to output data to a user. For example, the output device 108 may be a display or a speaker, wired or wireless communications port, among others. When the output device 108 is a display, the output device 108 may output an image or video to the user.

The input device 110 may be one or more of any type of device configured to receive user input. The input device 110 may be a keypad or buttons, among others. In an embodiment, the input device 110 and the output device 108 may be a touchscreen operative to both display data or images to a user and receive user input. A user may use the input device 110 to control the optical system 104. The user may use the input device 110 to trigger image capture by the optical system 104.

The camera device 100 may include one or more wired or wireless communication interfaces configured to communicate with an external device. For example, the one or more wired or wireless communication interfaces may be a modem or transceiver. The one or more wired or wireless communication interfaces may communicate with the external device and may send images or video to the external device. The camera device 100 may include other elements, devices or entities not shown in FIG. 1, which is simplified for ease of description.

Figure 2:
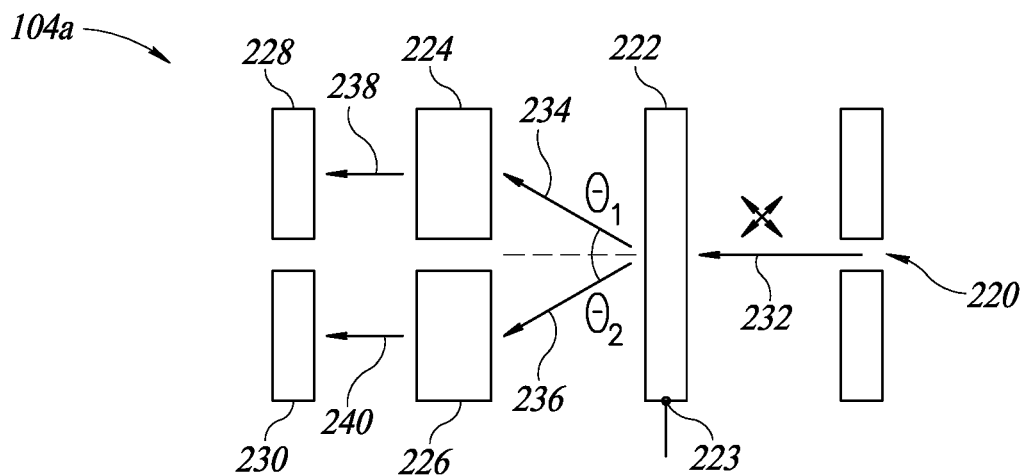
FIG. 2 shows an example of an optical system of a camera device in accordance with an embodiment.

FIG. 2 shows an example of an optical system 104a in accordance with an embodiment. The optical system 104a includes an aperture 220, a spatially varying polarizer 222 having an input 223, a first optical portion 224, a second optical portion 226, a first sensor 228 and a second sensor 230. The aperture 220 may be any type of opening operative to permit the passage of light for imaging.

The spatially varying polarizer 222 may be formed of one or more multi-twist retarders (MTR), which is a waveplate-like retardation film that provides precise and customized levels of broadband, narrowband or multiple band retardation in a single thin film. More specifically, MTR comprises two or more twisted liquid crystal (LC) layers on a single substrate and with a single alignment layer. Subsequent LC layers are aligned directly by prior layers, allowing simple fabrication, achieving automatic layer registration, and resulting in a monolithic film with a continuously varying optic axis. Due to its spatially varying property, the multi-twist retarder provides localized optical correction. The localized optical correction may operate upon the portion of received light.

The spatially varying polarizer 222 may be configured to operate as a correction optic and cause light passing therethrough to undergo refraction (according to a refractive index) or diffraction (according to a diffraction pattern). The spatially varying polarizer 222 may be formed as a polarization-directed lens and have electrically-controllable focal length for focusing passing light and may perform collimation on the passing light. Due to its spatially varying property, the multi-twist retarder provides localized optical correction that is switchable (e.g., via input from a controller).

The spatially varying polarizer 222 may diffract received light. The diffraction may be a function of a polarization of the received light. Further, the spatially varying polarizer 222 may convert the polarization of the received light from one polarization state to another polarization state. In addition, the spatially varying polarizer 222 may output two or more polarization states for received light and diffract the two or more polarization states differently depending on their respective polarizations. The spatially varying polarizer 222 may also decompose received light into two or more components having respective polarization states and diffract the two or more components differently depending on their respective polarization states.

The first and second optical portions 224, 226 may each be an arrangement, assembly or chain of optical elements, such as lens and polarizers, among others, that are operative to optically modify traversing light. The optical portions 224, 226 may each operate on the traversing light before capture by respective first and second sensors 228, 230.

The first and second sensors 228, 230 may each be any type of optical or camera sensor. The first and second sensors 228, 230 may each be a charge-coupled device (CCD) or an active-pixel complementary-symmetry metal-oxide-semiconductor (CMOS), among others. In at least some implementations, the first and second sensors 228 and 230 comprise different portions of a single sensor, e.g., left and right portions of a single sensor.

The optical system 104a receives light 232 via the aperture 220. The light 232 impinges on the spatially varying polarizer 222. The light 232 may have any polarization state, such as unpolarized, linear, circular or elliptical. The spatially varying polarizer 222 operates as a polarization-dependent diffraction optic. The spatially varying polarizer 222 outputs two light components; a first component 234 diffracted at an angle $\theta_1$ and a second component 236 diffracted at an angle $\theta_2$. The first component 234 has a first polarization state and the second component 236 has a second polarization state. The first and second polarization states may be linear or non-linear (e.g., circular or elliptical) and may be orthogonal (e.g., s polarization, p polarization) to each other or non-orthogonal to each other.

The first component 234 and the second component 236 may be constituent components of the impinging light 232. The spatially varying polarizer 222 may decompose or deconstruct the impinging light 232 into two polarization components in the form of the first and second components 234, 236. Although the term component is used herein to refer to the first and second components 234, 236, it is noted that the term is not intended to limit the first and second components 234, 236 to constituent components of the impinging light 232 into which the impinging light 232 is deconstructed or decomposed.

The spatially varying polarizer 222 may convert the polarization of the impinging light 232 to the two polarization states. The spatially varying polarizer 222 may convert the polarization of the impinging light 232 to the first polarization and output the first component 234 as a result of the polarization conversion to the first polarization. The spatially varying polarizer 222 may convert the polarization of the impinging light 232 to the second polarization and output the second component 236 as a result of the polarization conversion to the second polarization. The first and second polarization states of the first and second components 234, 236 may be horizontal and vertical or vice-versa, respectively, or right circular and left circular or vice-versa, respectively, among others.

The spatially varying polarizer 222 outputs the first and second components 234, 236 into respective directions such that the two components are separated in space. As shown in FIG. 1, the first component 234 is output at an angle of $\theta_1$ counterclockwise with respect to a reference and the second component 236 is output at an angle of $\theta_2$ clockwise with respect to the reference.

The first and second optical portions 224, 226 are respectively positioned to receive the first and second components 234, 236 diffracted by the spatially varying polarizer 222. The angles of diffraction (01 and 02) may be known, whereby the spatially varying polarizer 222 may be formed to diffract light according to the angles of diffraction (01 and 02). The angles of diffraction (01 and 02) inform the positioning of the first and second optical portions 224, 226 in the optical system 104a.

As described herein the first and second optical portions 224, 226 operate on the first and second components 234, 236, respectively. Each optical portion 224, 226 may operate on the first and second components 234, 236, respectively by converging, diffracting, collimating, focusing or defocusing, among others, the first and second components 234, 236, respectively. Each optical portion 224, 226 optically corrects a respective component 234, 236. The first and second optical portion 224, 226 respectively output first and second optically-corrected components 238, 240.

The first and second optically-corrected components 238, 240 impinge on the first and second sensors 228, 230, respectively. The first and second sensors 228, 230 capture first and second images, respectively. The first and second sensors 228, 230 may be operated (by the controller 102) independently or in unison. Effectively, the optical system 104a becomes a two-camera or two-sensor system having the form factor of one sensor or one camera, whereby the optical system 104a captures two images with one aperture 220.

As noted above, one sensor may be used in place of the sensors 228, 230. Pixel position may inform whether captured light pertains to the first image or the second image. With reference to FIG. 2, when one sensor is used in place of the sensors 228, 230, pixels located in an upper portion of the sensor may pertain to the first image, whereas pixels located in a lower portion of the sensor may pertain to the second image.

The input 223 of the spatially varying polarizer 222 may be coupled to an output of the controller 102. The spatially varying polarizer 222 may receive via the input 223 a signal indicating whether the spatially varying polarizer 222 is to be on (active) or off (inactive). When inactive, the spatially varying polarizer 222 may not perform the optical correction described herein that it is formed to perform. Due to its material composition, when inactive, the spatially varying polarizers 222 may only perform inherent optical correction associated with the material composition. Materials of various types have optical properties and are operative to change light. As described herein, the spatially varying polarizer 222 may be formed of two or more twisted liquid crystal layers. The liquid crystal layers of the spatially varying polarizer 222 when turned off may still perform inherent optical correction.

The optical system 104a may include a plurality of spatially varying polarizers 222 that may be stacked. Each spatially varying polarizer 222 may be switchable by the controller 102 between active and inactive states. The optical correction described herein that is performed by the spatially varying polarizer 222 may be distributed to the plurality of spatially varying polarizers 222. For example, a first spatially varying polarizer of the plurality may output the first component 234 and a second spatially varying polarizer of the plurality may diffract the first component 234 and direct the first component 234 to the first optical portion 224. Similarly, a third spatially varying polarizer may output the second component 236 and a fourth spatially varying polarizer may diffract the second component 236 and direct the second component 236 to the second optical portion 226. In addition, the first or second optical portion 224, 226 may include a spatially varying polarizer operative to perform the optical correction performed by the optical portion 224, 226.

Figure 3:
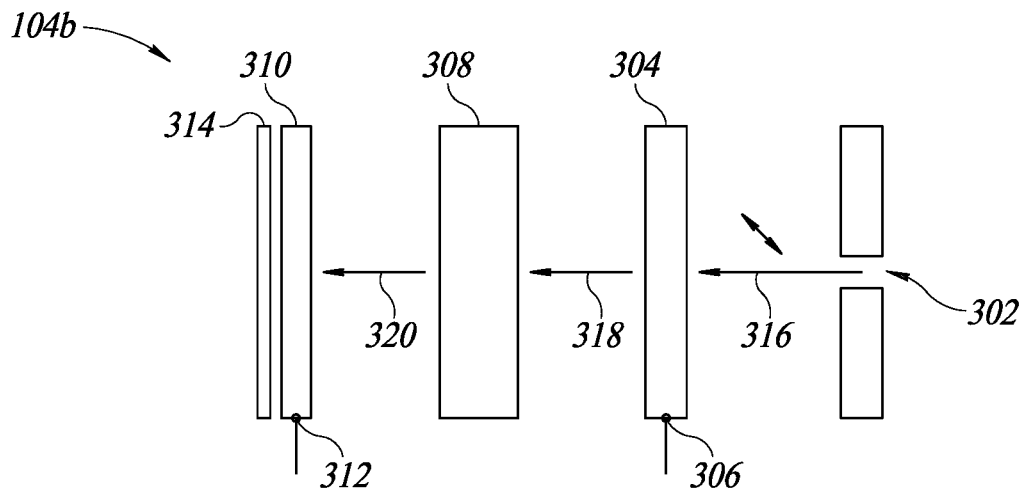
FIG. 3 shows another example of an optical system of a camera device in accordance with an embodiment.

FIG. 3 shows an example of an optical system 104b of a camera that utilizes a single optical path in accordance with an embodiment. The optical system 104b includes an aperture 302, a spatially varying polarizer 304 having an input 306, an optical portion 308, a spatially varying sensor filter 310 having an input 312 and a sensor 314. The aperture 302 may be any type of opening operative to permit the passage of light for imaging.

The spatially varying polarizer 304 receives light 316 passing through the aperture 302 and performs optical correction or modification on the light 316. Performing the optical correction or modification may include performing diffraction, light collimation, light focusing, focal length modification, polarization conversion or aberration correction, angular deflection (e.g., polarization specific angular deflection), among others. The optical correction may be based on or a function of a polarization state of the light 316 or components thereof. The spatially varying polarizer 304 outputs filtered light 318.

The spatially varying polarizer 304 may change the polarization of the light 316 or decompose or deconstruct the light 316 into polarization components. For example, the filtered light 318 (output by the spatially varying polarizer 304) may have a first component having a first polarization P1 (e.g., horizontal or right circular) and a first focal length and a second component having a second polarization P2 (e.g., vertical or left circular) and a second focal length. The first and second focal lengths may be different. For example, the first focal length may be two units of distance, whereas the second focal length may be 50% more than the first focal length or double the first focal length and may, accordingly, be three or four units of distance, respectively. In addition, the first and second focal lengths may substantially the same but made different and modified to improve image resolution or perception. The second focal length may be 0.1% to 5% more or less than the first focal length. By way of example only, if the first focal length is two units of distance, the second focal length may be 1.9 to 1.998 or 2.002 to 2.1 units of distance. In an embodiment, the second focal length may be different than the first focal length by 0.5% to 2% of the first focal length.

The optical portion 308 may provide common optics for the light having the first polarization P1 and the light having the second polarization P2, and outputs modified light 320 including the first and second components to the spatially varying sensor filter 310 and sensor 314.

The filtered light impinges on the optical portion 308. As described herein, the optical portion 308 may be an arrangement, assembly or chain of optical elements, such as lens and polarizers, among others, that are operative to optically modify the filtered light 318. The optical portion 308 may converge, diffract, collimate, focus or defocus the filtered light 318, among other types of optical correction.

Figure 4:
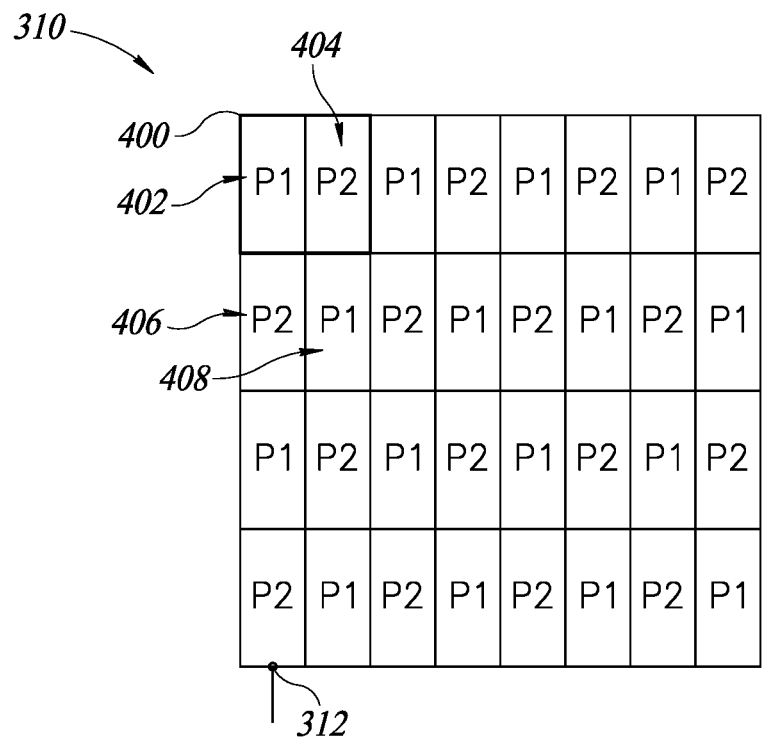
FIG. 4 shows an example of a spatially varying sensor filter of the optical system of FIG. 3 in a first state.

FIG. 4 shows an example of the spatially varying sensor filter 310 in a first state. The spatially varying sensor filter 310 comprises a plurality pixel filters that may correspond to an overlay the pixels on the sensor 314 to selectively control the light that reaches each of the pixels of the sensor 314. In at least some implementations, the spatially varying sensor filter 310 may be configured such that, when turned on, alternating pixels pass either light having a first polarization P1 or a second polarization P2. In FIG. 4, "P1" in a pixel filter denotes that the spatially varying sensor filter 310 passes the modified light 320 having the polarization P1 and blocks passage of the modified light 320 having the polarization P2 and "P2" denotes that the spatially varying sensor filter 310 permits passage of the modified light 320 having the polarization P2 and blocks passage of the modified light 320 having the polarization P1.

The modified light 320 that includes both light in the polarization P1 and light in the polarization P2 may impinge on the spatially varying sensor filter 310, for example, on the first and second pixels 402, 404. When configured as shown in FIG. 4, the spatially varying sensor filter 310 permits passage of the modified light 320 having the P1 polarization in a first pixel filter 402 and blocks passage of the modified light 320 having the polarization P2. In a neighboring second pixel filter 404, the spatially varying sensor filter 310 reverses the filtering performed at the first pixel filter 402. The spatially varying sensor filter 310 blocks passage of the modified light 320 having polarization P1 in the second pixel filter 404 and permits passage of the modified light 320 having the polarization P2. In at least some implementations, the spatially varying sensor filter 310 is switchable and may reverse or otherwise change the filtering performed. A first pattern of the first state of the spatially varying sensor filter 310 may be switched to a second pattern of the second state of the spatially varying sensor filter 310. The spatially varying sensor filter 310 may receive, via the input 312, a signal from the controller 102 indicating whether the spatially varying sensor filter 310 is to operate in the first state, second state or another state.

Figure 5:
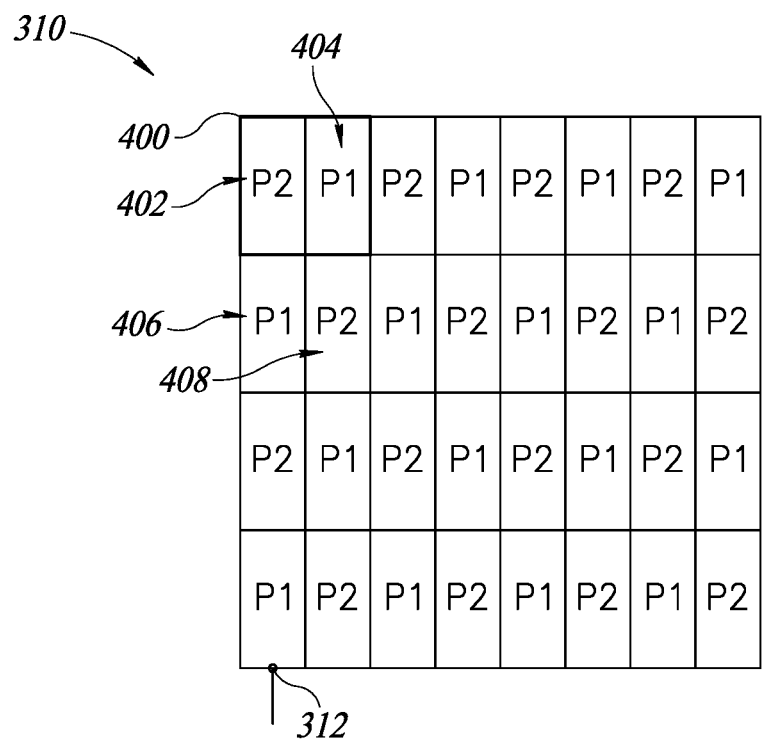
FIG. 5 shows an example of the spatially varying sensor filter in a second state.

FIG. 5 shows an example of the spatially varying sensor filter 310 in a second state. In the second state, the first pixel filter 402 of the spatially varying sensor filter 310 blocks passage of the modified light 320 having the polarization P1 and permits passage of the modified light 320 having the polarization P2. In the neighboring second pixel filter 404, the spatially varying sensor filter 310 permits passage of the modified light 320 having the polarization P2 and blocks passage of the modified light 320 having the polarization P1.

The controller 102 switches the spatially varying sensor filter 310 between the first and second states using the input 312. The spatially varying sensor filter 310 may include two spatially varying polarizers; a first spatially varying polarizer having the grating properties of the first state and a second spatially varying polarizer having the grating properties of the second state. The controller 102 may operate the spatially varying sensor filter 310 in the first state by switching on the first spatially varying polarizer and switching off the second spatially varying polarizer. The controller 102 may operate the spatially varying sensor filter 310 in the second state by switching off (or inactivating) the first spatially varying polarizer and switching on the second spatially varying polarizer.

Referring back to FIG. 3, the spatially varying sensor filter 310 and the sensor 314 may be stacked or layered such that the pixel filters of the spatially varying sensor filter 310 correspond to the pixels of the sensor 314. The controller 102 may operate the spatially varying sensor filter 310 such that alternating frames captured by the sensor 314 are alternately filtered by the spatially varying sensor filter 310 switching between the first and second states. Every other frame may be filtered by the spatially varying sensor filter 310 having the first state and remaining every other frames may be filtered by the spatially varying sensor filter 310 having the second state.

When focal lengths of the first and second components of the modified light 320 are substantially the same but made different, such as by a factor of 0.1% to 5%, the combination of two frames (e.g., consecutive) respectively filtered according to the first and second states of the spatially varying sensor filter 310 provides "super resolution" image or video, e.g., by averaging multiple frames together to get higher angular resolution. The first or second state may also be used independently for narrow-angle operation or image capture or jointly for wide-angle operation or image capture.

When focal lengths of the first and second components of the modified light 320 are different, each frame may provide a half resolution image, each with different focal lengths for example, and the combination of the two frames respectively filtered according to the first and second states of the spatially varying sensor filter 310 provides a full resolution image or video for each polarization state. Thus, the camera may capture half-resolution images or video for each polarization state at a full frame rate, or may capture full resolution images or video for each polarization state a frame rate that is one-half the full frame rate. Thus, in at least some implementations, there may be a trade-off between resolution and frame rate, which can be selected by the operator as desired.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A camera device, comprising:
   a spatially varying polarizer stack configured to receive light, the spatially varying polarizer stack comprising a first spatially varying polarizer stacked together with a second spatially varying polarizer;
   a controller operatively coupled to the spatially varying polarizer stack, the controller configured to selectively switch each of the first and second spatially varying polarizers between an active state and an inactive state, wherein, when the first spatially varying polarizer is in the active state and the second spatially varying polarizer is in the inactive state, the first spatially varying polarizer diffracts a first component of the received light at a first non-zero angle, and when the second spatially varying polarizer is in the active state and the first spatially varying polarizer is in the inactive state, the second spatially varying polarizer diffracts a second component of the light at a second non-zero angle different from the first angle, the first component having a first polarization and the second component having a second polarization different from the first polarization;
   first and second optical portions positioned to receive the first and second components, respectively, and configured to perform first and second optical correction on the first and second components, respectively, and to output first and second optically-corrected components, respectively; and
   a sensor configured to capture the first and second optically-corrected components of the light.

2. The camera device of claim 1, wherein the first optical portion is configured to perform at least one of: diffraction according to a diffraction pattern, light collimation, light focusing, image sharpening, angular resolution modification, focal length modification or aberration correction on the first component.

3. The camera device of claim 1, wherein the second optical portion is configured to perform at least one of: diffraction according to a diffraction pattern, light collimation, light focusing, image sharpening, angular resolution modification, focal length modification or aberration correction on the second component.

4. The camera device of claim 1, wherein the sensor includes:
   a first sensor configured to capture the first optically-corrected component; and
   a second sensor configured to capture the second optically-corrected component.

5. A camera device, comprising:
   a sensor configured to capture an image at a plurality of pixels;
   a spatially varying polarizer configured to:
   receive light; and
   output a first component of the light having a first polarization state and a second component of the light having a second polarization state different from the first polarization state;
   an optical portion configured to perform optical correction on the first and second components, respectively, and output first and second optically-corrected components, respectively;
   a spatially varying sensor filter configured to operate in a first state having a first filter pattern and a second state having a second filter pattern; and
   a controller configured to output a signal to the spatially varying sensor filter indicative of whether the spatially varying sensor filter is to operate in the first state or the second state,
   wherein, in the first state, the spatially varying sensor filter is configured to permit passage of light having the first polarization state to a first set of pixels of the plurality of pixels and block passage of light having the second polarization state to the first set of pixels, and to block passage of light having the first polarization state to a second set of pixels of the plurality of pixels and permit passage of light having the second polarization state to the second set of pixels and, wherein, in the second state, the spatially varying sensor filter is configured to block passage of light having the first polarization state to the first set of pixels and permit passage of light having the second polarization state to the first set of pixels, and to permit passage of light having the first polarization state to the second set of pixels and block passage of light having the second polarization state to the second set of pixels.

6. The camera device of claim 5, wherein the optical portion performs at least one of: diffraction according to a diffraction pattern, light collimation, light focusing, image sharpening, angular resolution modification, focal length modification or aberration correction on the first component.

7. The camera device of claim 5, wherein the spatially varying polarizer and the spatially varying sensor filter each comprise a multi-twist retarder (MTR).

8. The camera device of claim 5, wherein the first and second sets of pixels are mutually exclusive and a combination of the first and second sets of pixels forms the plurality of pixels.

9. The camera device of claim 5, where the controller is configured to alternately switch the spatially varying sensor filter between the first state and the second state between consecutive frames of image or video capture.

10. The camera device of claim 9 wherein the controller is operative to generate two full resolution images using two consecutive frames, each of the consecutive frames comprising a half-resolution image for light received in each of the first and second polarization states.

11. The camera device of claim 5, where the controller is configured to operate the spatially varying sensor filter in the first state or the second state for narrow-angle image or video capture.

* * * * *